J. Flower,
Stop Cock.
No. 104,568. Patented June 21. 1870.

Elevation

Section

Witnesses
H. F. Obert
R. C. Smith

Inventor
James Flower
per Atty
Chas. S. Sprague

UNITED STATES PATENT OFFICE.

JAMES FLOWER, OF DETROIT, MICHIGAN.

STOP-VALVE.

Specification forming part of Letters Patent No. 104,568, dated June 21, 1870.

*To whom it may concern:*

Be it known that I, JAMES FLOWER, of Detroit, in the county of Wayne and State of Michigan, have invented a new and useful Improvement in Stop-Valve; and I do declare that the following is a true and accurate description thereof, reference being had to the accompanying drawing, and to the letters of reference marked thereon, and being a part of this specification, in which—

Figure 1:
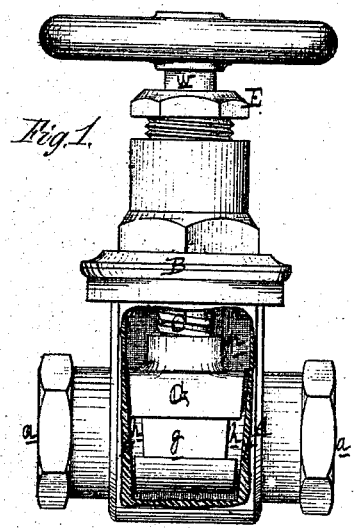
Figure 2:
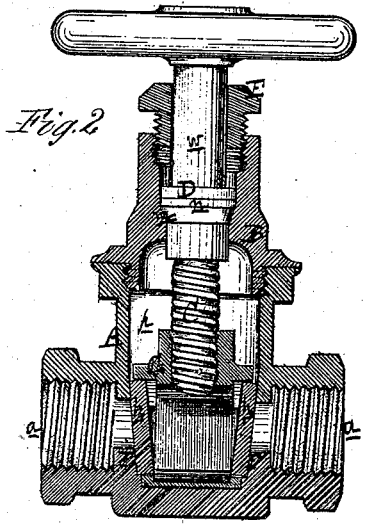
Figure 3:
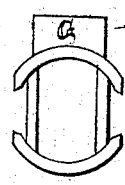
Figure 4:
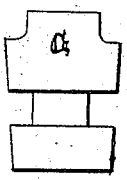
Figure 5:
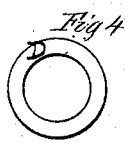

Figure 1 is an elevation of my improved valve, with a portion broken out to show the interior construction. Fig. 2 is a vertical section of the same. Fig. 3 shows two detached views of the cage to carry the valves and spindle. Fig. 4 shows two detached views of the loose-fitting ring, fitting on the spindle under the nut. Fig. 5 shows two detached views of the equalizing-bar, which fits into each side of the cage.

Like letters indicate like parts in each figure.

The nature of this invention relates to an improvement in valves for steam, water, gas, or any fluids where a faucet-gate or cock is used; and consists in a pair of flat metallic valves, fitting loosely in a cage, so that they can revolve freely in the same, closing against two bevel or straight seats in the shell or box, by means of two equalizing-bars, set loosely in each side of the cage, said cage being operated by a screw in opening or closing the valves.

In the accompanying drawing, A represents the shell or case of the valve, and is provided with a cap, B, which is screwed to its place, and through which passes the screw C, which is provided with a shoulder, $n$, and a conical seat, $m$, ground to a tight fit in the cap B.

D is a metallic ring or follower that is sleeved on the screw-spindle $w$, and is held firmly in place by the nut E, and does away with packing the valve-spindle, as the conical seat makes a tight joint.

The steam or water way $a$ $a$ passes through the shell on a line at right angles with the screw C, and is provided with two flat seats, F, one being on the inside of each water-way.

In a cavity or chamber, $p$, in the shell is the cage G, within which are placed the flat disk-valves $h$, which are held equally against the spaces of the seats F when closed by means of the equalizing-bars $g$. The valve-plates $h$ are fitted into the cage so that they will revolve freely. The cage G receives the screw C, which, in raising the valve, passes into the center of the cage and between the valves.

On each side of the cage G is a recess to receive the equalizing-bars $g$, which compel the valves $h$ to press equally on both faces. In closing the valve it will be observed that with this arrangement of the valve-plates they bear equally upon the seats, and are held rigidly in place when the valves are closed, so that the resistance is positive against pressure on either face of the valves.

What I claim as my invention, and desire to secure by Letters Patent, is—

1. The cage G to receive the valves $h$ and screw C, and provided with recesses to hold the equalizing-bars $g$, when arranged and operating substantially as herein set forth.

2. The valves $h$, when inclosed in the cage G, and operated by the screw C and equalizing-bars $g$, as herein specified.

3. The construction of a stop-valve wherein the case A, cap B, screw C, ring D, nut E, seats F, cage G, water-ways $a$, valves $h$, equalizing-bars $g$, and conical seat $m$ are constructed and arranged substantially as and for the purpose herein described.

JAMES FLOWER.

Witnesses:
JAS. I. DAY,
R. C. SMITH.